United States Patent [19]

Hirtreiter et al.

[11] 4,174,827
[45] Nov. 20, 1979

[54] AIRSPRINGS

[75] Inventors: Arthur B. Hirtreiter, Akron; Paul R. Brown, Tallmadge, both of Ohio

[73] Assignee: The Goodyear Tire & Rubber Company, Akron, Ohio

[21] Appl. No.: 839,488

[22] Filed: Oct. 4, 1977

[51] Int. Cl.² .............................................. F16F 9/04
[52] U.S. Cl. ................................................... 267/65 B
[58] Field of Search ............................ 267/65 A, 65 B

[56] References Cited

U.S. PATENT DOCUMENTS 3,682,464   8/1972   Krejcir ............................... 267/65 B

FOREIGN PATENT DOCUMENTS 638445   3/1962   Canada .................................... 267/65 B
1182534  11/1964  Fed. Rep. of Germany ......... 267/65 B
964138   7/1964   United Kingdom ................... 267/65 B
1210465  10/1970  United Kingdom ................... 267/65 B Primary Examiner—Duane A. Reger
Attorney, Agent, or Firm—D. M. Ronyak

[57] ABSTRACT

A high ratio L/D sleeve type rolling lobe airspring is modified to provide column stabilization and correct a "weinering" effect by reason of a collar mounted at the plug end of the airspring sleeve. The collar prevents the inflated sleeve from rolling over a mounting ring that retains the sleeve on the plug. In another embodiment a rigid member is mounted inside of the airspring to limit the kink effect of the sleeve at a full jounce position such that upon being repressurized under restrained load the sleeve returns to an axially symmetric configuration.

8 Claims, 7 Drawing Figures

AIRSPRINGS

BACKGROUND OF THE INVENTION

This invention generally relates to sleeve type, rolling lobe airsprings as distinguished from bellows type airsprings and more particularly to a high ratio L/D sleeve type rolling lobe airspring that exhibits full recovery upon pressurization from a full jounce position and column stabilization under load in a pressurized condition.

A rolling lobe airspring is defined as a pneumatic device that has a piston attached to an inner bead at one end of an enclosed reversible flexible member and upon the application of load forces to the device, the flexible member is caused to roll down over the piston. While various types and configurations of rolling lobe airsprings are known and used in the art, the purpose of this invention is to provide an economically produced sleeve type rolling lobe airspring that has a higher L/D ratio than heretofore produced and which is column stabilized against lateral deflections that have tended to limit the working height and thus the L/D ratio of the flexible membrane that could be tolerated in some applications.

The invention further provides a high ratio L/D sleeve type airspring that, upon being pressurized, recovers from lateral kinks in the sleeve acquired in a full jounce position.

DESCRIPTION OF THE DRAWINGS

These advantages and other advantages and improvements in the art will be better understood from the following description when considered in conjunction with the accompanying drawings in the several figures of which like reference numerals identify like elements, and in which.

BRIEF DESCRIPTION OF THE INVENTION

Figure 1:
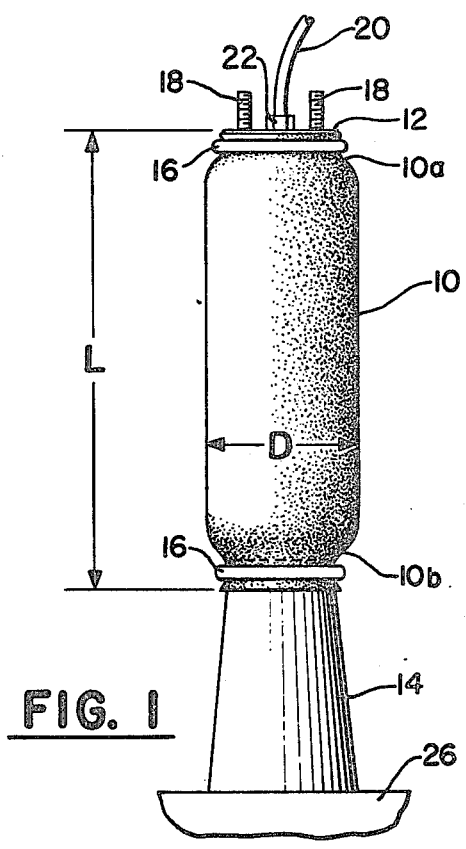
FIG. 1 is an elevational view of a typical sleeve-type rolling lobe airspring showing it in an unpressurized, unloaded and fully extended condition.

Referring to the drawings, FIG. 1 shows an unmounted, unloaded and unpressurized rolling lobe type airspring which comprises a flexible membrane 10 in a substantially cylindrical sleeve configuration, an end-plug 12 that is mounted into one end of the sleeve at 10a, and a piston 14 that is mounted into the other end of the sleeve at 10b. The sleeve ends 10a and 10b are retained on the plug 12 and piston 14 respectively by swaged-on rings 16 that effect a sealed airtight chamber between the plug 12, piston 14 and sleeve 10. The plug 12 is adapted for mounting by reason of bolt studs 18 and accepts air pressure 20 into the sleeve chamber by way of a hollow stud 18 or else by way of a separate fitting 22 connected through the plug. Alternate arrangements of mounting and connecting the air supply into the chamber may be made, as for example, the air supply may be connected through the piston. Of course, the manner of mounting will depend on the particular application.

It should be clearly apparent from the drawing that the airspring of this invention may be distinguished from other type airsprings by reason of its length i.e., a high L/D ratio where L is the overall length of the flexible member and D is its diameter. Further, the rolling lobe airspring of this invention may be distinguished by a substantially tubular or sleeve configured membrane as opposed to a bellows type membrane. The airspring may further be distinguished by the fact that the membrane is a mandrel formed open-ended flexible sleeve whereas the other types are fully molded sections characterized by molded in beads at their open ends. Thus, the sleeve type rolling lobe airspring may be distinguished from all others by its basic configuration, its manner of manufacture and its mode of operation.

Figure 2:
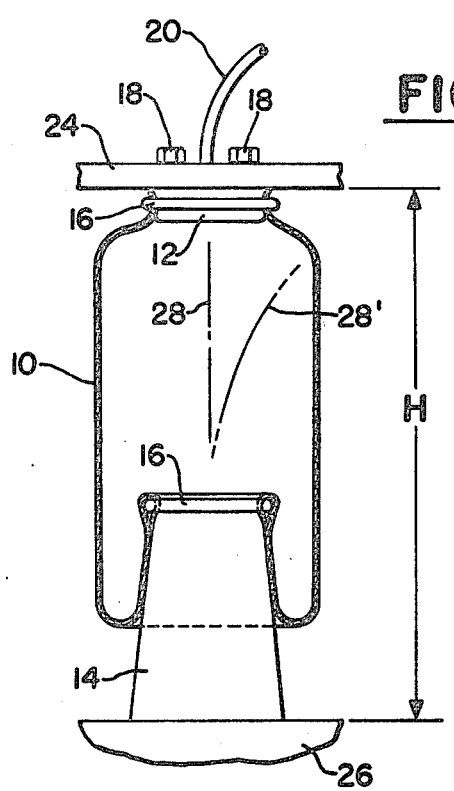
FIG. 2 is an elevational view, partially in section, showing the airspring of FIG. 1 in a pressurized, loaded, and working or design height condition.

Turning now to FIG. 2, the airspring of FIG. 1 is shown in its mounted, loaded and pressurized working position. In this condition, the end plug 12 is mounted to an upper plate 24 while the piston 14 is mounted to a lower plate 26, both plates capable of relative motion between them, either along the airspring axis 28 or along an off-axis arc 28' dependent, of course, on the type of installation. It should be understood that FIG. 2 illustrates an idealized working configuration for the airspring at its design height H wherein the design height is defined as that selected position of the spring which satisfies the spring travel requirements between full rebound and full jounce and is usually specified by a dimension H between reference points on the upper and lower extreme parts of the spring as mounted and commonly identified as a plate-to-plate dimension. In practice, high ratio L/D sleeve type rolling lobe airsprings have not been able to attain this idealized configuration and the reasons for this will be more fully appreciated as the description continues with reference to FIGS. 3 and 4.

Figure 3:
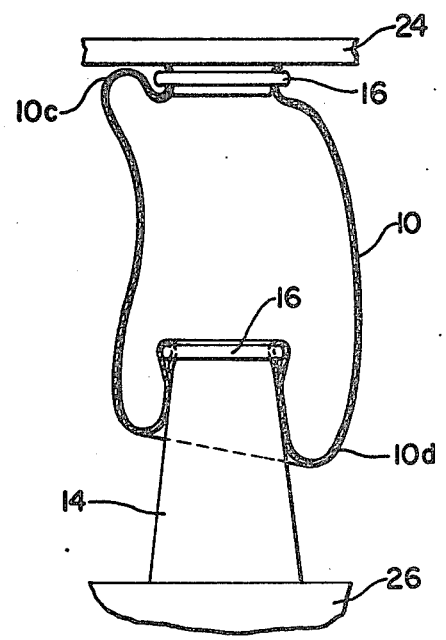
FIG. 3 is an elevational view, partially in section, illustrating a lateral deflection or "weinering" effect experienced by an unmodified high-ratio L/D airspring of FIG. 2.

FIG. 3 illustrates a lateral deflection problem experienced by a high ratio L/D sleeve type rolling lobe airspring. Firstly, and because the flexible membrane is in a sleeve or substantially tubular configuration as opposed to a fully molded section, its diameter expands laterally upon being inflated to its working pressure. Secondly, and further because of its sleeve configuration, the ends are mounted to the plug 12 and piston 14 by way of swagedon rings 16 as opposed to a bead type mounting characteristic of the other types of airsprings. In this circumstance and because of the high ratio L/D of the cylindrical sleeve, the membrane tends to deflect laterally and roll upwardly such as at 10c while also rolling downwardly on the opposite side such as at 10d. The airspring thus exhibits an instability called "weinering" which is detrimental in its intended application.

Figure 4:
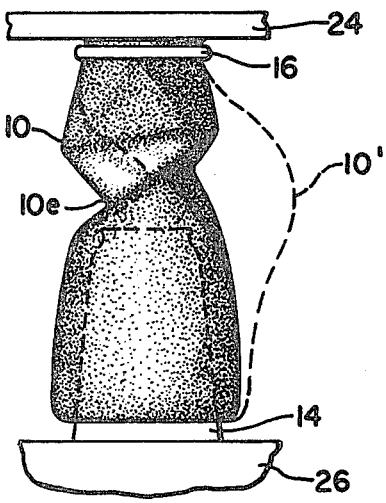
FIG. 4 is an elevational view of an unmodified sleeve type rolling lobe airspring showing it at full jounce and illustrating a lateral kinking, and the problem experienced upon re-pressurizing the spring.

FIG. 4 illustrates a kinking effect experienced by high ratio L/D sleeve type airsprings when unpressurized and in a full jounce position. In this unpressurized condition, the cylindrical sleeve membrane 10 tends to kink such as at 10e, and upon being repressurized, while restrained under load the kink becomes accentuated laterally as shown by 10' rather than recovering to its intended column configuration as illustrated by FIG. 2.

Figure 5:
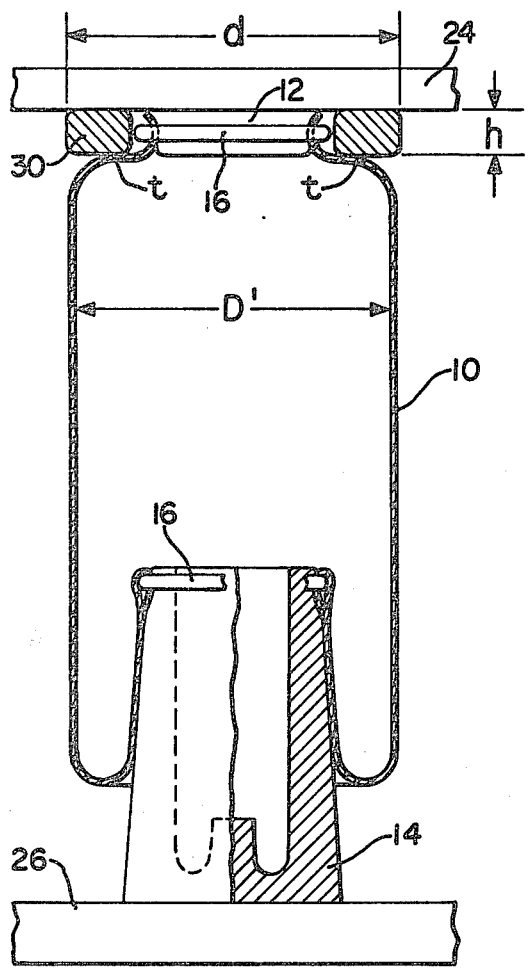
FIG. 5 is an elevational view, partially in section, of an improved high ratio L/D sleeve type rolling lobe airspring modified in accordance with the teaching of this invention.

FIG. 5 illustrates a high ratio L/D sleeve type rolling lobe airspring modified in accordance with this invention to correct the instability problem shown in FIG. 3. In the drawing, a collar 30 is mounted on the airspring at the end plug 12 such that upon mounting the airspring to a member 24 the collar fills in the space created by the end plug to a thickness "h" at least that of the plug 12. The diameter "d" of the collar is at least to the point of tangency "t" of the flexible membrane having an inflated diameter D'. Upon being loaded the membrane 10 maintains its column stability by reason of the collar preventing the membrane from rolling upwardly over the ring 16. As shown in the drawing, the collar 30 may be a separate item or in some applications it may be designed into the configuration of the mounting plate 24. In either case the collar 30 must have the minimum thickness "h" and diameter "d" as herebefore stated.

Figure 6:
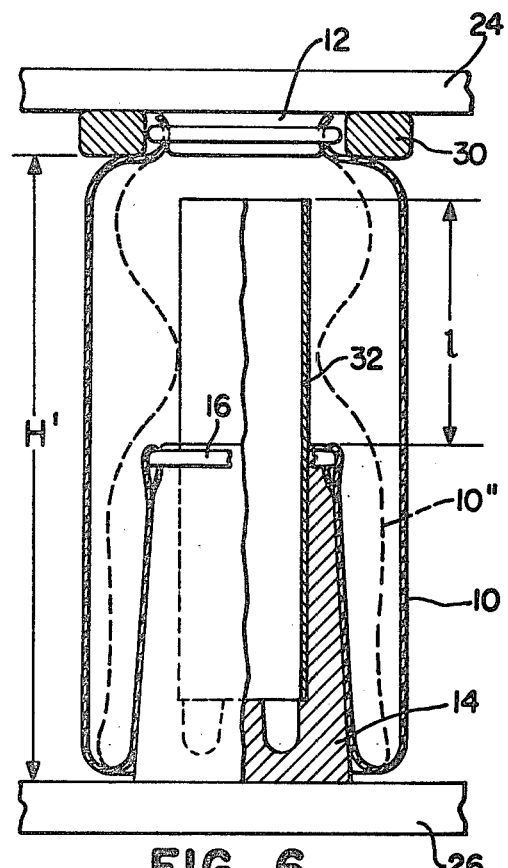
FIG. 6 is an elevational view, partially in section, of a further modified high ratio L/D, sleeve type rolling lobe airspring.

FIG. 6 illustrates a further modification that is made to the airspring of FIG. 2 to limit the kink effect at full jounce. In this circumstance, a thin-walled tubular member 32 is positioned in the airspring chamber such that the flexible membrane 10 is limited in its lateral excursion due to kink as illustrated by the dashed line showing 10''. The member 32 is thin-walled to retain the required spring rate by virture of a pre-established air volume within the chamber and its length "1" is established by the minimum of the design height H selected for the particular airspring application. Of course, the tubular member 32 may as well be mounted at the top of the airspring to the end plug 12 to obtain the same benefit as described with respect to its mounting to the piston. Furthermore, it is anticipated that the member 32 may be made of metal, plastic or any other material that results in a rigid structure and may be mounted within the airspring chamber by any means so long as the configuration and type mounting results in a maintenance of the required spring rate established for the airspring. Upon repressurizing, the airspring flexible membrane is restrained from excessive lateral movement and therefore full axial symmetry under load is accomplished.

Figure 7:
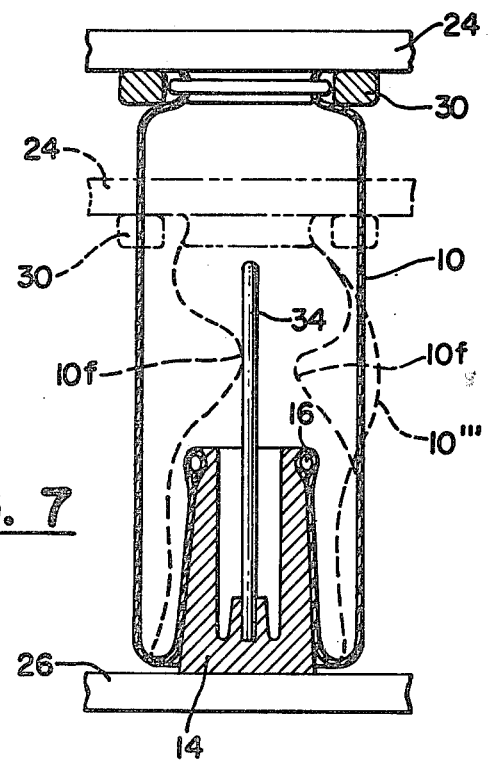
FIG. 7 is an elevational view, partially in section, of another embodiment of a high ratio L/D, sleeve type rolling lobe airspring that is also modified in accordance with this invention.

FIG. 7 illustrates an embodiment wherein the preselected spring rate of a high L/D ratio airspring is preserved by mounting a rod 34 within the airspring chamber such as to limit the lateral excursion of the membrane as at 10f. In this circumstance, when the airspring is not pressurized and may be in the dashed line position indicated by 10'', the limit provided by the rod 34 allows for full recovery of the airspring upon its pressurization. Of course it will be recognized that the member 32 of FIG. 6 or the member 34 of FIG. 7 may be of any rigid configuration so long as the pre-established spring rate of the airspring is maintained.

While certain representative embodiments and details have been shown for the purpose of illustrating the invention, it will be apparent to those skilled in this art that various changes and modifications may be made therein without departing from the spirit or scope of the invention.

What is claimed is:

1. A high ratio L/D rolling lobe airspring mounted between two members capable of relative motion between them comprising:
    a piston mounted to one of the members;
    a plug mounted to the other of the members;
    a flexible sleeve type membrane mounted at one of its ends to the piston and at the opposite end to the plug by means of ring fittings to form an airtight chamber between them, the mounting being such that the piston moves axially into the tubular membrane and the membrane walls form lobes encasing the piston;
    means to pressurize the chamber; and
    a collar mounted at the end of the membrane having the plug, exteriorly of and axially aligned with the plug such as to limit any upward excursion of the membrane upon being subjected to load forces.

2. The airspring as set forth in claim 1 wherein the L/D ratio is equal to or greater than 2.5.

3. The airspring as set forth in claim 2 wherein the collar has a thickness equal to that of the plug and a diameter equal to at least the point of tangency to the inflated membrane.

4. The airspring as set forth in claim 1 wherein the collar is formed as part of the member mounted to the plug.

5. A high ratio L/D rolling lobe airspring mounted between two members capable of relative motion between them comprising in combination:
    a piston mounted to one of the members;
    a plug mounted to the other of the members;
    a tubular-walled sleeve type flexible membrane mounted at one of its ends to the piston and at the opposite end to the plug by means of ring fittings to form an airtight chamber between them, the mounting being such that the piston moves axially into the tubular membrane and the membrane walls form lobes encasing the piston;
    means to pressurize the chamber; and
    means mounted within the chamber to limit the lateral deflection of the membrane when in its full jounce position such that upon being inflated the membrane returns to an axially symmetric configuration.

6. The airspring as set forth in claim 5 wherein the means mounted within the chamber comprises a cylindrical member mounted to the piston, said cylindrical member being thin-walled to maintain the spring rate established for the airspring.

7. The airspring as set forth in claim 5 wherein the means mounted within the chamber comprises a rod.

8. The airspring as set forth in claim 6 also comprising a collar mounted at the end of the membrane having the plug, exteriorly of and axially aligned with the plug such as to limit any upward movement of the membrane upon being subjected to load forces.

* * * * *